United States Patent Office 3,100,781
Patented Aug. 13, 1963

3,100,781
CHLORAMPHENICOL GLYCINATE AND THE PRODUCTION THEREOF
Carlo T. Concilio and Antonio Tezza, Milan, Italy, assignors to Zambon S.p.A., a company of Italy
No Drawing. Filed Nov. 3, 1958, Ser. No. 771,235
Claims priority, application Germany Nov. 20, 1957
12 Claims. (Cl. 260—343.7)

Chloramphenicol is known as an antibiotic. It is characterized by its bitter taste and slight water solubility.

Esters of chloramphenicol with several high molecular weight aliphatic acids such as palmitic acid and with several aromatic acids such as benzoic and cinnamic acids are also known. These esters are, indeed, tasteless, but also insoluble in water.

In addition, esters of chloramphenicol with succinic acid and phthalic acid have been prepared. These are made water soluble by salt formation with sodium or other bases and are suitable for parenteral administration of the antibiotic.

All of these known esters of chloramphenicol have the property that they are ineffective as such, and are only effective after the acyl residue has been removed by enzymatic hydrolysis and the antibiotic set free: virtually, however, hydrolysis does not take place under in vitro conditions of use and is also not very rapid and not complete in vivo.

According to the invention, a novel ester of chloramphenicol of formula

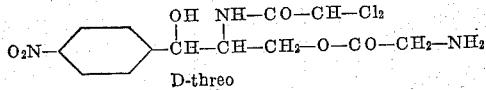

D-threo is obtained which is even hydrolyzable in water alone, besides by enzymes of course.

The process of the invention for the preparation of a chemotherapeutically effective ester of chloramphenicol is characterized in that chloramphenicol is allowed to react with a halogenated acetyl halide in an organic solvent such as dimethylformamide or dioxane in the presence of basic matter such as pyridine, or pyridine derivates, the resulting halogenated acetic acid ester being aminated whereby a glycinate ester of formula

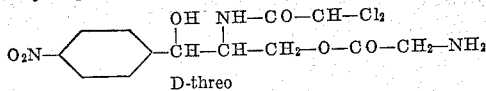

D-threo is obtained, which can be transformed through treatment with acid into the corresponding acid addition salt.

Hexamethylenetetramine is advantageously employed as the aminating agent.

In a preferred embodiment of the process of the invention, haloacetyl halides such as bromoacetyl chloride or chloroacetyl chloride are employed.

The hexamethylenetetramine salt of the halogenated acetic acid ester can be transformed to the corresponding acid addition salt of the glycinate ester by treatment with a strong mineral acid, for example concentrated hydrochloric acid. From this the basic ester is obtained by treatment with alkali, which can then be transformed to the corresponding acid addition salts by treatment with acids.

It is advantageous that the acid treatment of the basic ester be conducted in an organic solvent in which the acid addition salts are insoluble.

The acid addition salts can also be prepared in an aqueous medium from which they can be obtained by freezedrying.

Compared with the known water-soluble esters of chloramphenicol, the glycinate ester, which is also water-soluble by proper salification with acid, has an outstanding advantage: that is, this ester is very much hydrolyzed by water and the antibiotic set free at a speed which increases as the pH value is increased. After 6 hours at 37° C., the hydrolysis of the glycinate ester in a buffer solution with a pH of 6.5 amounts to about 50%, and at a pH of 7.2 the hydrolysis reaches 90%.

This fact agrees with the observation that the glycinate ester is effective against chloramphenicol-sensible microorganisms also in vitro, which does not occur with the known water-soluble esters of chloramphenicol.

Therefore, taking into account the pH value of blood and several biological fluids, the setting free of antibiotic may be considered almost complete in vivo independently of the esterases. The observation that blood levels of microbiologically effective chloramphenicol measured after parenteral administration of chloramphenicol glycinate are similar to those obtainable with pure chloramphenicol, which does not occur with the known water-soluble esters of chloramphenicol, shows that an enzymatic hydrolysis ends the high chemical hydrolysis.

As a conclusion it can be stated that, the glycinate ester of chloramphenicol is suitable for parenteral administration of the antibiotic or for uses which need effective water-soluble chloramphenicol; moreover, one can use lower doses of glycinate ester derivates than is the case with the known water-soluble esters.

Example 92.5 g. of chloramphenicol dissolved in 400 cc. of anhydrous dioxane and 23.8 g. of water-free pyridine was mixed with 47.4 g. of bromoacetyl chloride. After the reaction product was held at 30° C. for 60 minutes, it was poured into water and extracted with ethyl acetate. The solution was evaporated in vacuo and the residue treated with chloroform. A crystalline product was obtained having a melting point of 106–7° C. and a rotation of $(\alpha)_D^{20} = 33°$ (c.=1% ethanol) which was identified as the bromoacetic acid ester of chloramphenicol; yield 58%.

46.62 g. of chloramphenicol bromoacetate was added to a solution of 18.3 g. of hexamethylenetetramine in 200 cc. of chloroform at 25° C. The temperature was raised to 40 to 45° C.; and the reaction mixture held at this temperature for 2 hours. The solution was cooled to 20° C., the chloroform decanted and the residue treated with ethyl acetate. The product was collected by decantation and dissolved in 175 cc. of ethyl alcohol. 4 mole equivalents of concentrated hydrochloric acid were added and the resulting mixture shaken overnight at room temperature. The ammonium chloride which had separated was removed by filtration and the filtrate concentrated to a syrup. The crystallization of the residue was induced by the addition of chloroform. The product thus obtained, crystallized from ethanol, had the following properties; Melting point: 180–181° C.; $(\alpha)_D^{20} = +20$ (c.=5% water);

$$E_{1\,cm}^{1\%} = 243 \pm 5 \text{ at } \lambda = 276 \text{ m}\mu \text{ (water)}$$

The product is the hydrochloride of the glycinate ester of chloramphenicol. The yield of the hexamethylenetetramine salt was 85% and the yield of the amine hydrochloride was 30–35%.

5 g. of the hydrochloride of the glycinate ester of chloramphenicol was dissolved in 60 cc. of water, cooled at 0–1° C. and cold one normal sodium hydroxide solution was added until a slightly alkaline pH was obtained; the resulting precipitate was collected by filtration, washed first with water and afterwards with ethyl alcohol 50%, and dried; melting point: 132–133° C.; $(\alpha)_D^{20} = +30.8$ (c.=3% ethanol);

$E_{1\ cm.}^{1\%} = 270 \pm 5$ at $\lambda = 276$ m$\mu$ (water)

The product is the glycinate ester of chloramphenicol; yield 92%.

The yields have been given for each step.

When the bromoacetic acid ester and the hexamethylenetetramine compound, which appeared oily, were not purified, the overall yield of the amino ester rose to 25–30% of the theoretical amount.

By employing chloroacetyl chloride in place of bromoacetyl chloride, the corresponding chloroacetic acid ester of chloramphenicol having a melting point of 108–9° C. and $(\alpha)_D^{20} = 39.5$, was obtained in a yield of 70%. When, in this case, the intermediate products were not purified, the overall yield of the glycinate ester rose to 35–40%.

Salts: 2 g. of the glycinate ester of chloramphenicol was dissolved in 100 cc. of anhydrous dioxane and anhydrous hydrogen chloride led into the solution. The resulting precipitate was collected by filtration and washed. It was the hydrochloride described above.

2 g. of the glycinate ester of chloramphenicol was suspended in anhydrous ethyl alcohol and neutralized with an anhydrous ethanolic solution of sulfuric acid. Upon the addition of anhydrous ethyl ether, a precipitate was obtained which was the neutral sulfate of the ester; melting point: 140–141° C.; $(\alpha)_D^{20} = +18$ (c.=5% water).

Upon the addition of the glycinate ester of chloramphenicol to an aqueous solution of the following acids and subsequent freezedrying, the corresponding salts were obtained in solid form; levulinic acid (M.P. 68–72° C.), ascorbic acid (M.P. 81–85° C.), tartaric acid (M.P. 95–100° C.), citric acid (M.P. 95–100° C.), phosphoric acid (M.P. 119–125° C.), succinic acid (M.P. 65–76° C.), acetic acid (M.P. 75–77° C.), hydrochloric acid (M.P. 180–81° C.) and sulfuric acid (M.P. 139–142° C.).

Each of the values in parentheses is the melting point of the addition salts of the chloramphenicol glycinate with the acid indicated.

We claim:

1. A member of the group consisting of a D-threo amino acid ester of the following formula

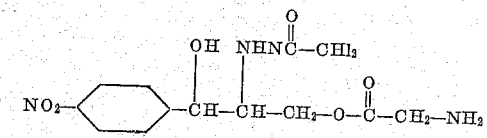

and water-soluble, non-toxic, acid addition salts thereof.

2. D - (−) - threo - 1 - (p-nitrophenyl) - 2 - dichloroacetamido-3-aminoacetoxy-1-propanol.

3. D - (−) - threo - 1 - (p-nitrophenyl) - 2 - dichloroacetamido-3-aminoacetoxy-1-propanol hydrochloride.

4. D - (−) - threo - 1 - (p-nitrophenyl) - 2 - dichloroacetamido-3-aminoacetoxy-1-propanol sulfate.

5. D - (−) - threo - 1 - (p-nitrophenyl) - 2 - dichloroacetamido-3-aminoacetoxy-1-propanol levulinate.

6. D - (−) - threo - 1 - (p-nitrophenyl) - 2 - dichloroacetamido-3-aminoacetoxy-1-propanol ascorbate.

7. D - (−) - threo - 1 - (p-nitrophenyl) - 2 - dichloroacetamido-3-aminoacetoxy-1-propanol tartrate.

8. D - (−) - threo - 1 - (p-nitrophenyl) - 2 - dichloroacetamido-3-aminoacetoxy-1-propanol citrate.

9. D - (−) - threo - 1 - (p-nitrophenyl) - 2 - dichloroacetamido-3-aminoacetoxy-1-propanol phosphate.

10. D - (−) - threo - 1 - (p-nitrophenyl) - 2 - dichloroacetamido-3-aminoacetoxy-1-propanol succinate.

11. D - (−) - threo - 1 - (p-nitrophenyl) - 2 - dichloroacetamido-3-aminoacetoxy-1-propanol acetate.

12. A process for the production of a member of the group consisting of a D-threo aminoacid ester of the formula:

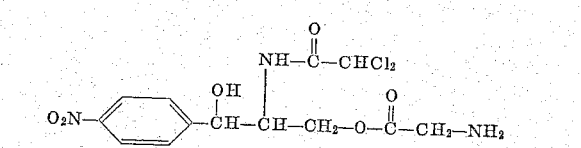

which comprises reacting D-threo-1-(p-nitrophenyl)-2-dichloroacetamido-1.3-propandiol with a mono-halogenated acetyl halide of formula X—CH₂—CO—X', where X and X' are the same or different Cl and Br radicals, in an organic solvent and in the presence of a tertiary amine to prepare a D-threo-1-(p-nitrophenyl)-2-dichloroacetamido-3-(monohalogenated) acetoxy-1-propanol, reacting the D - threo - 1 - (p-nitrophenyl) - 2 - dichloroacetamido - 3 - (monohalogenated) acetoxy - 1 - propanol with hexamethylenetetramine, and treating the product thus obtained with a mineral strong acid, and thereafter with an alkaline hydroxide.

References Cited in the file of this patent

UNITED STATES PATENTS

| | | |
|---|---|---|
| 2,460,708 | Mozingo et al. | Feb. 1, 1949 |
| 2,514,376 | Crooks et al. | July 11, 1950 |
| 2,727,061 | Vercellone et al. | Dec. 13, 1955 |